US006722631B2

(12) United States Patent
Bailey (10) Patent No.: US 6,722,631 B2
(45) Date of Patent: Apr. 20, 2004

(54) VALVE DEVICE (75) Inventor: Patrick Warren Bailey, East Yorkshire (GB)

(73) Assignee: Aventis Cropscience S.A. (FR)

( * ) Notice: Subject to any disclaimer, the term of this patent is extended or adjusted under 35 U.S.C. 154(b) by 49 days.

(21) Appl. No.: 10/091,227

(22) Filed: Mar. 4, 2002

(65) Prior Publication Data

US 2002/0162983 A1 Nov. 7, 2002

(30) Foreign Application Priority Data

Mar. 9, 2001 (GB) .............................. 0105905

(51) Int. Cl.⁷ ................................. F16K 1/22
(52) U.S. Cl. ....................... 251/251; 251/288; 251/301; 251/340
(58) Field of Search ................ 251/305, 340, 251/286, 288, 251; 222/185.1

(56) References Cited

U.S. PATENT DOCUMENTS

| | | | |
|---|---|---|---|
| 1,226,722 A | | 5/1917 | Sullivan |
| 1,759,060 A | * | 5/1930 | Moore .................. 251/340 |
| 2,665,873 A | * | 1/1954 | Backman et al. ........... 251/305 |
| 4,285,499 A | * | 8/1981 | Zukausky ................... 251/251 |
| 5,096,096 A | * | 3/1992 | Calaunan ................ 222/185.1 |
| 5,150,735 A | | 9/1992 | Bandy et al. |
| 5,794,647 A | | 8/1998 | Denmark et al. |

FOREIGN PATENT DOCUMENTS

| | | |
|---|---|---|
| BE | 479 506 | 1/1949 |
| EP | 0 389 919 | 10/1990 |
| EP | 0 685 155 | 12/1995 |

* cited by examiner

Primary Examiner—John Bastianelli
(74) Attorney, Agent, or Firm—Harness, Dickey & Pierce, P.L.C.

(57) ABSTRACT

A valve device has an outer sleeve with a first end to be secured in an orifice of a container. A second end is releasably attached to a receptacle. Walls define a generally cylindrical support passage which extends from said first end to said second end. An inner sleeve is within the support passage with walls defining a generally outer surface adjacent the walls of the outer sleeve. The walls rotatably support the inner sleeve and define an internal through passage. A butterfly valve member is in the through passage. The butterfly valve has diametrically opposed first and second pivot stubs which extend at least into the walls of the inner sleeve to rotatably support the butterfly valve. The walls of the outer sleeve have a profiled opening into which the first pivot stub extends. The first pivot stub includes a cam member which interacts with the profiled opening. Relative rotation of the inner and outer sleeves causes the butterfly valve member to rotate between a closed state and an open state.

19 Claims, 4 Drawing Sheets

VALVE DEVICE

CROSS-REFERENCE TO RELATED APPLICATIONS

This application claims priority to Great Britain Patent Application No. 0105905.4 filed Mar. 9, 2001, which application is herein expressly incorporated by reference.

BACKGROUND OF THE INVENTION

The present invention relates to a valve device and a method of connecting a container filled with a flowable material, such as fertilizer, pesticide or the like, to a receptacle, for instance of an applicator device for dispensing the material.

It is known to provide dispensing or applicator devices for distributing fertilizer or pesticide in a field. Containers of the fertilizer or pesticide may be provide for attachment to the dispensing or applicator device, such that, when a container is empty, it may be removed and replaced with a full one.

It is preferable that users of the dispensing device do not come into contact with the material in the containers.

EP-A-0389919 discloses a valve system for controlling the flow of a flowable agricultural treatment agent from a container for the material to a receiving chamber or hopper. The container has a material dispensing valve and the chamber or hopper has a material receiving valve. The dispensing valve and the receiving valve are adapted to be coupled and uncoupled so that, on being coupled, both valves are opened to allow material to flow from the container to the hopper and, on being uncoupled, both valves are biassed to a closed position.

Although this system prevents the user from coming into contact with the material in the container, it is relatively complex and expensive.

EP-A-0685155 discloses a valve device comprising a cylindrical housing in which a cylindrical valve member is axially displaceable. The housing includes a valve seat around the inner end of a flow passage and the cylindrical valve member has a valve disk which selectively seals with the valve seat. In particular, by virtue of a cam groove, relative rotation of the two cylinders causes them to move towards or away from one another and thereby close or open the valve.

This valve device still has a number of disadvantages. In particular, it requires the two halves of the valve device to move axially which, in turn, requires the container to move axially with respect to the receptacle to which it is attached. Also, closing the valve may be difficult when the valve plate has to move against a weight of flowable material. Furthermore, the available through passage for the flowable material is limited to the peripheral space around the valve disk when it is moved away from the valve seat.

SUMMARY OF THE INVENTION

It is an object of the present invention to provide an alternative valve device which is relatively simple and which achieves automatic opening and closing when being attached to or detached from a receptacle.

According to the present invention, there is provided a valve device for connecting a container filled with a flowable material to a receptacle and for dispensing the flowable material from the container into the receptacle, the valve device including an outer sleeve having a first end to be secured to the orifice of a container, a second end for releasable attachment to a receptacle and walls defining a generally cylindrical support passage extending from said first end to said second end, an inner sleeve within the support passage having walls defining a generally outer surface adjacent the walls of the outer sleeve so as to rotatably support the inner sleeve and defining an internal through passage, a butterfly valve member within the through passage having diametrically opposed first and second pivot stubs extending at least into the walls of the inner sleeve and rotatably supported by the walls of one of the inner and the outer sleeve wherein the walls of the other of the inner and outer sleeve are shaped so as to interact with at least the first pivot stub such that relative rotation of the inner and outer sleeve causes the butterfly valve member to rotate between a closed state in which the butterfly valve member closes the through passage by substantially filling an internal cross-section of the through passage and an open state in which the through passage is open.

Thus, the valve member may be provided in or adjacent the orifice of a container and normally have the butterfly valve member in a closed state. By rotating the inner and outer sleeves relative to one another, for instance as a part of engaging the valve device with a receptacle for the flowable material, the first pivot stub and, hence, the butterfly valve member are rotated to an open position to allow flow through the valve device.

In use, once a container has been connected to a receptacle using the valve device, the flowable material can all be dispensed into the receptacle and then the valve device and container detached. However, in a preferred application, the container and valve device are left connected until more material is required. In this way, the receptacle does not have to receive all of the flowable material at once and is supplied from the container according to its needs.

No axial movement is required to open and close the valve and, with the butterfly valve fully open, the only restriction to flow is the thickness of the butterfly valve itself. Furthermore, by virtue of the property of a butterfly valve that one side moves in a direction opposite to the other side, moving the valve against the flowable material is made easier, since material will merely flow from one side of the passage to the other.

The flowable material is preferably of solid form, for instance of granular form, but might also be liquid if the valve is designed to seal appropriately.

The butterfly valve itself preferably comprises a plate-like member having a shape corresponding to the internal cross-sectional area of the inner sleeve. This is preferably circular, but could be square or any other cross-sectional shape. The plate-like member may have a shape corresponding to an internal cross-sectional area which is angled, i.e. not perpendicular, to the axis of the inner sleeve so that it cannot rotate within the inner sleeve beyond that position. The butterfly valve then includes a rotational axis through approximately its middle and in its own plane.

The first and second pivot stubs can be rotatably supported in the outer sleeve and pass through apertures in the inner sleeve shaped so as to rotate the butterfly valve. In this case, the pivot stubs need not extend right through the outer sleeve, but may be supported in indented portions.

On the other hand, the first and second pivot stubs may be rotatably supported by the inner sleeve. In which case, only the first pivot stub need pass through the inner sleeve so as to interact with the outer sleeve and the second pivot stub could be supported merely by an indented portion in the walls of the inner sleeve.

The interacting sleeve may have walls shaped in any appropriate way to rotate the first pivot stub. For instance, an elongate aperture having teeth along one surface may interact with teeth provided around the outer periphery of the first pivot stub. Alternatively, an end face of the first pivot stub may be provided with a radially extending slot interacting with a pin or provided with a cranked pin interacting with a slot.

Preferably, the walls of the other of the inner and outer sleeves include a profiled opening and the first pivot stub extends into the profiled opening and includes a cam member such that relative rotation of the inner and outer sleeves causes interaction of the cam member and the profiled opening to rotate the butterfly valve member between the closed and opened states.

Of course, the profiled opening may be provided in either of the inner or outer sleeves, provided that the first and second pivot stubs are rotatably supported by the other of the inner and outer sleeves.

Preferably, the cam member extends radially of the first pivot stub. In this way, lateral movement applied to the cam member will cause rotational movement of the first pivot stub and the butterfly valve member.

Preferably, the profiled opening is generally trapezoid in shape having a long portion extending circumferentially with respect to the generally cylindrical support passage along which the first pivot stub moves with relative rotation of the inner and outer sleeves and a short portion extending circumferentially with respect to the generally cylindrical support passage into which the cam member extends, the cam member being deflected by the walls of the other of the inner and outer sleeves joining the long and short portions so as to rotate the butterfly valve member.

Thus, an elongate trapezoidal opening is provided in a circumferential direction of the inner and outer sleeves. While the rotational part of the first pivot stub is free to move along the entire length of the long portion, the radially extending cam member is restricted to move only the length of the short portion. Hence, as the rotational part of the first pivot stub moves from one end of the long portion to the other, at some point, the cam member will come into contact with an end wall of the profiled opening, be constrained from movement and, hence, rotate the first pivot stub.

In a preferred embodiment to be described, the short portion is positioned symmetrically with respect to the centre of the long portion. However, by angling the cam member differently with respect to the butterfly valve member, it is also possible for the short portion to be offset to one side with respect to the long portion.

Preferably, the first and second opposed pivot stubs are rotatably mounted in the walls of the inner sleeve and the walls of the inner sleeve include at least a first through hole for rotatably supporting the first pivot stub, the walls of the outer sleeve including the profiled opening and the first pivot stub extending through said first through hole into the profiled opening. In this way, the inner sleeve, through which the flowable material passes, has a relatively uninterrupted surface, only requiring a through hole for the first pivot stub and an indented support portion for the second pivot stub. Furthermore, as will be described below, it becomes possible to operate the butterfly valve automatically as part of a bayonet fitting.

Preferably at least one of the first and second pivot stubs extend beyond the periphery of the outer sleeve so as to form a bayonet pin for interacting with a bayonet groove of a receptacle. Thus, when the valve device is inserted into a female bayonet fitting and rotated, the or both pivot stubs which form bayonet pins are constrained from movement while the outer sleeve is rotated. In this way, the inner sleeve and the first pivot stub are rotated relative to the outer sleeve such that the first pivot stub interacts with the outer sleeve so as to open or close the butterfly valve member. Of course, the pivot stubs could be inserted into grooves in the female bayonet fitting of the receptacle other than the L-shaped grooves for securing the valve device in place, provided those grooves restrain movement of the pivot stubs so as to cause relative rotation between the pivot stubs and the inner sleeve with the outer sleeve.

As an alternative, the walls of the outer sleeve preferably include a first circumferentially extending aperture and the inner sleeve includes a first bayonet pin extending through the aperture for interacting with a bayonet groove of a receptacle, the circumferential extent of the aperture being sufficient to allow relative rotation of the inner and outer sleeves to cause the butterfly valve member to rotate between the closed and open states. Thus, similarly to described above, when inserted in a female bayonet fitting, the bayonet pin will be restrained from movement, such that the outer sleeve will be rotated relative to the inner sleeve. Similarly, the bayonet pin may engage grooves other than the L-shaped grooves of the bayonet fitting.

Preferably, the walls of the outer sleeve include a second circumferentially extending aperture and the inner sleeve includes a second bayonet pin extending through the second aperture for interacting with a bayonet groove of a receptacle, the circumferential extent of the second aperture being sufficient to allow relative rotation of the inner and outer sleeves to cause the butterfly valve member to rotate between the closed and open states. In this way, for a bayonet fitting including two bayonet pins, both bayonet pins may be provided on the inner sleeve. Preferably, the first and second apertures are diametrically opposed and the first and second bayonet pins are diametrically opposed. This is the preferred arrangement for a two-pin bayonet fitting.

Preferably, the valve device further includes an actuation shaft wherein the inner sleeve includes a pair of diametrically opposed support openings for supporting the actuation shaft there between, the actuation shaft extending outwardly of the support openings so as to form the first and second bayonet pins.

The actuation shaft may be positioned parallel with and actually offset from the axis of the butterfly valve member and, with an appropriate spacing there between, can be used as a stop for the butterfly valve member. Hence, preferably, the first aperture is axially aligned with the profile opening and the centre of the first bayonet pin is axially aligned with the centre of the first pivot stub.

The walls of the other of the inner and outer sleeves and the first pivot stubs are shaped so as to interact with lost motion such that the butterfly valve member is rotated between the closed and open state only after some intermediate relative rotation of the inner and outer sleeves. With the bayonet arrangement discussed above, this ensures that the pins of the bayonet are fully engaged before the butterfly valve member is opened. Thus, the inner and outer sleeves may be relatively rotatable only between two predetermined relative orientations and the butterfly valve member rotates between the closed and open states only as the inner and outer sleeves approach and are in the vicinity of the predetermined relative orientations.

Of course, a bayonet arrangement for the valve device will itself introduce some lost motion, since the outer sleeve will not rotate relative to the inner sleeve until the bayonet pins reach the end of the bayonet channels, thereby ensuring that the valve device is secured to the receptacle. The walls of the outer sleeves may further define a generally cylindrical outer surface for fitment to a receptacle. Thus, the bayonet fitting may be formed from the outer surface of the outer sleeve.

However, the valve device may further comprise an outer housing within which the outer sleeve is supported. The outer housing may cover only part of the outer housing, for instance to conceal parts, such as the profiled opening, interacting with the first pivot stub.

However, the housing may include a generally cylindrical outer surface for fitment to a receptacle. In this case, bayonet pins emanating from the inner or outer sleeves protrude through the housing. In a preferred embodiment, the inner and outer sleeves are both generally cylindrical bodies and are coaxial.

According to the present invention, there is also provided a container filled with a flowable material having an orifice fitted with a valve device as described above.

Also, according to the present invention, there is provided a method of connecting a container of flowable material to a receptacle including the steps of providing an outlet of the container and the receptacle with corresponding male and female bayonet fittings respectively, providing a butterfly valve in the outlet and rotating the butterfly valve so as to open or close the orifice according to relative rotation of the orifice and at least one bayonet pin of the male bayonet fitting.

BRIEF DESCRIPTION OF THE DRAWINGS

The present invention will be more clearly understood from the following description given by way of example only, with reference to the accompanying drawings, in which.

DETAILED DESCRIPTION OF THE PREFERRED EMBODIMENTS

The following description relates to a preferred embodiment. However, it will be appreciated from the alternatives discussed above that other embodiments are also possible.

Figure 1:
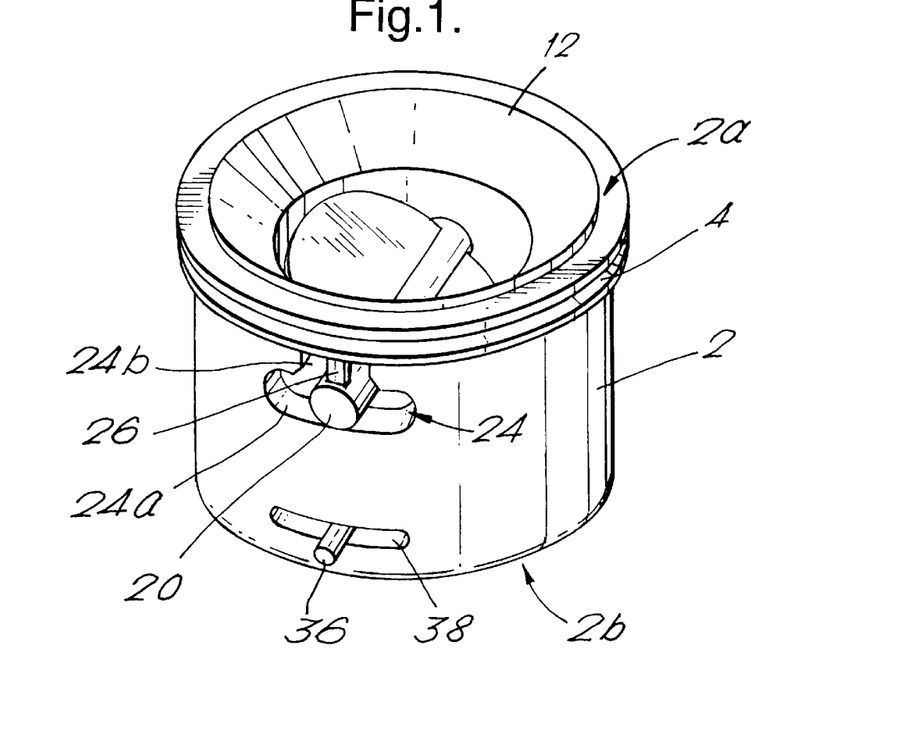
FIG. 1 is a perspective view of a valve device embodying the present invention.
Figure 2:
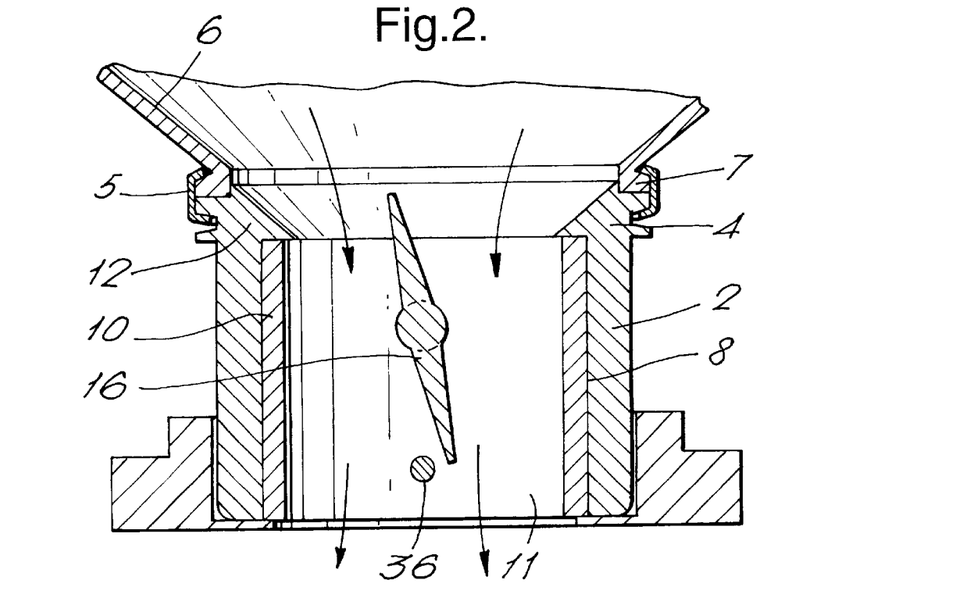
FIG. 2 is a cross-section view through the valve device of FIG. 1.

As illustrated in FIGS. 1 and 2, the valve device comprises an outer sleeve 2 which extends from a first end 2a to a second end 2b. The first end 2a is provided with any suitable profile 4 for fitting to the orifice of a container.

As illustrated in FIG. 2, the walls 6 of a container meet with the first end 2a of the outer sleeve 2 adjacent a circumferential profile 4. A corresponding profiled band 5 is then positioned around the profile 4 and a lip 7 of the container so as to secure the valve device in place. Thus, the valve device is provided as an outlet to the container. The band 5 is preferably expandable and provided with an over centre mechanism to grip the profile 4 and lip 7. In this way, the container may easily be separated from the valve device for filling, though some form of security tag may be included to prevent unauthorised releasing of the band 5.

Of course, the first end 2a may be secured to a container in any convenient manner. For instance, co-operating screw threads may be provided on the valve device and container.

The outer sleeve 2 is provided with a cylindrical support passage 8 within which an inner sleeve 10 is rotatably supported. As illustrated, a through passage 11 is provided within the inner sleeve 10 for flow of material from the container through the inner and outer sleeves. The outer sleeve 2 includes an inner part-conical region 12 for guiding material into the through passage 11 within the inner sleeve 10.

Figure 4:
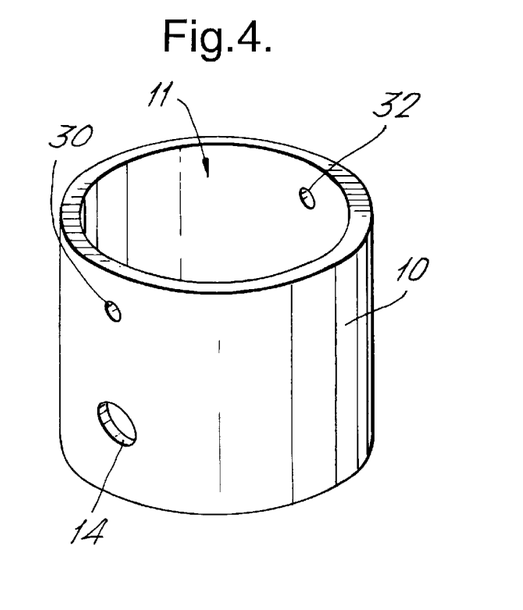
FIG. 4 is a perspective view of the inner sleeve of the device of FIG. 1.
Figure 5:
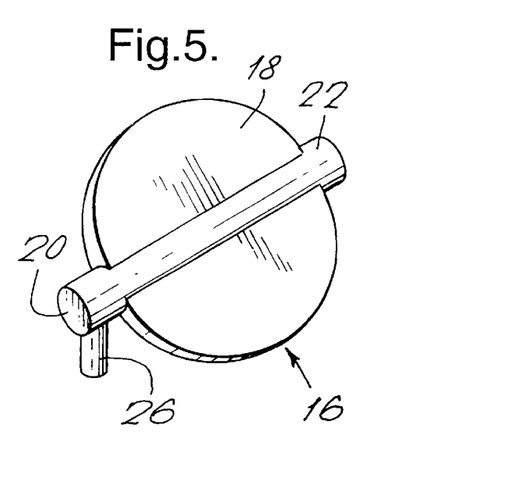
FIG. 5 is a perspective view of the butterfly valve member of the device of FIG. 1.

As illustrated in FIG. 4, the inner sleeve 10 includes a first through hole 14. This is for supporting the first pivot end 20 of a butterfly valve 16 as illustrated in FIG. 5. Although not illustrated, opposite the first through hole 14 across a diameter of the cylindrical inner sleeve 8, a second through hole or at least an indented circular portion is also provided for supporting the second pivot end 22 of the butterfly valve 16.

As illustrated the butterfly valve 16 has a generally plate-like member 18 having a shape and size to fill the internal cross-sectional area of the inner sleeve 10. Within the plane of the plate-like member 18 and across the centre of the member, a rotational shaft is provided. In particular, a first pivot stub 20 is provided at one end of the shaft and a second pivot stub 22 is provided at the other end.

The butterfly valve 16 is mounted in the inner sleeve 10 with the first pivot stub 20 protruding through the first through hole 14 and rotationally to be supported thereby and the second pivot stub inserted into or through the second (not illustrated) through hole or indent to be rotationally supported thereby.

Thus, as illustrated in FIG. 2, the butterfly valve 16 is rotationally supported within the inner sleeve 10. In the position illustrated in FIG. 2, flow (indicated by the arrows) is possible through the valve device. However, by rotating the butterfly valve 16 until it is in a plane approximately perpendicular to the axis of the inner and outer sleeves, the plate-like member 18 of the butterfly valve 16 fills the inner cross section of the inner sleeve 10 so as to prevent flow of material.

In a preferred embodiment, as will be discussed below, the plate-like member can be slightly elliptical such that it fills the inner cross-section before it reaches the perpendicular orientation. In this way, the walls of the inner sleeve prevent further rotation of the butterfly valve. Alternatively, appropriate stops may be included in the inner sleeves.

Figure 3:
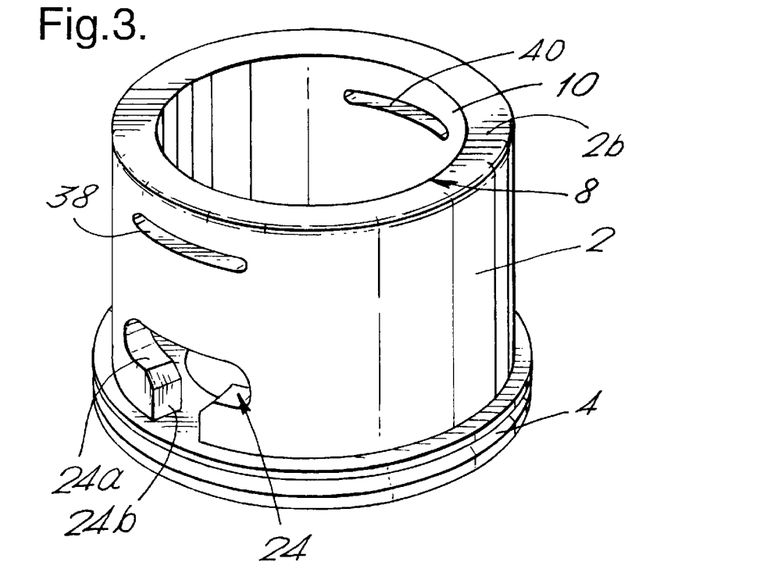
FIG. 3 is a perspective view of the outer sleeve of the device of FIG. 1.

As illustrated in FIGS. 1 and 3, the outer sleeve 2 is provided with a profiled opening 24. The illustrated profiled opening 24 extends completely through the wall of the outer sleeve 2. However, it is also possible for the profiled opening to extend only partly into the wall of the outer sleeve 2 such that it is concealed from the outside. Thus, as illustrated in FIG. 1, with the butterfly valve 16 mounted in the inner sleeve 10, the first pivot stub 20 extends into the profile opening 24 of the outer sleeve 2.

As mentioned above, the inner sleeve 10 is rotatable relative to the outer sleeve 2. As a result, when the inner sleeve 10 is rotated relative to the outer sleeve 2, the first pivot stub 20 moves circumferentially of the outer sleeve within the profiled opening 24.

As illustrated in FIGS. 1 and 5, the first pivot stub 20 is provided with a radially extending cam member 26. This too is located within the profile opening 24 of the outer sleeve 2.

The profiled opening 24 can be considered as comprising two portions, namely a long portion 24a and a short portion 24b. The first pivot stub 20 itself and, in particular, the rotational axis of the butterfly valve 16 is located within the long portion 24a, whereas the cam member 26 extends radially of the first pivot stub 20 into the short portion 24b.

Figure 7A:
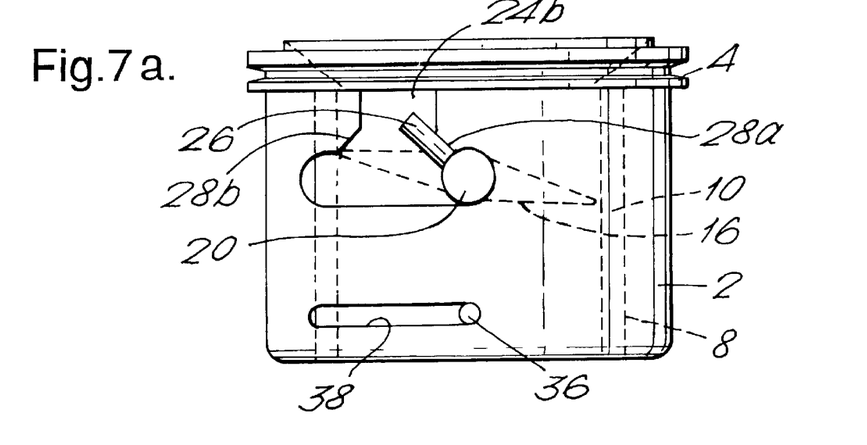
FIGS. 7(a) to (c) are side views of the operation of the butterfly valve member (shown in phantom) with relative rotation of the inner and outer sleeves.
Figure 7B:
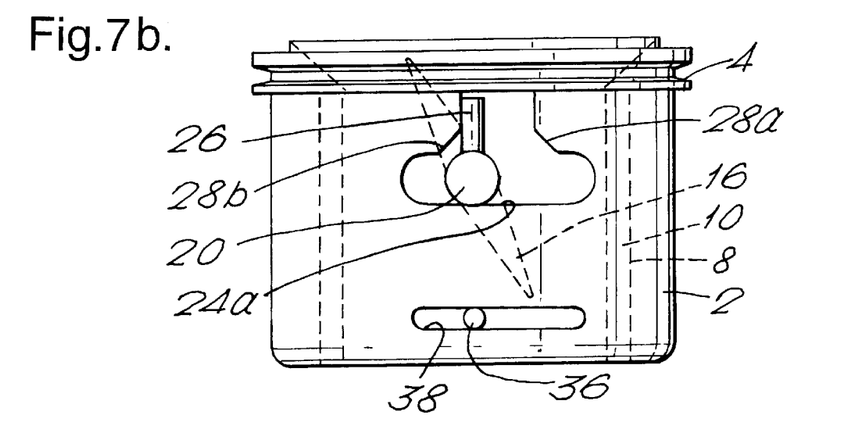
Figure 7C:
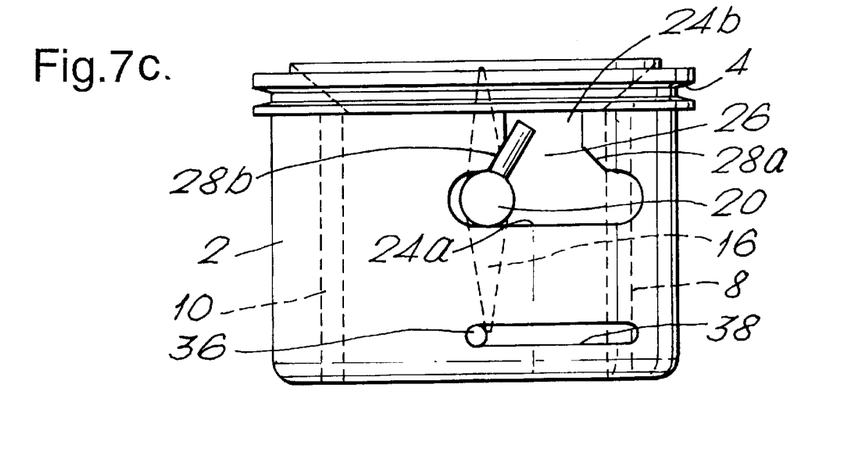

FIGS. 7(a) to (c) illustrate the effect of rotating the outer sleeve 2 relative to the inner sleeve 10. Indeed, in these Figures, the inner sleeve 10 and, hence, the rotational axis of the butterfly valve 16 remains in the same position while the outer sleeve 2 is rotated.

In FIG. 7(a) the butterfly valve 16 is in the closed state within the inner sleeve 10. The butterfly valve itself abuts the walls of the inner sleeve 10 and hence cannot rotate anti-clockwise as illustrated. Furthermore, the cam member 26 abuts a first end wall 28a joining the long 24a and short 24b portions such that the butterfly valve cannot rotate clockwise as illustrated. When the outer sleeve 2 is rotated, the cam member 26 is released from contact with the first end wall 28a such that the butterfly valve 16 may rotate clockwise as illustrated.

As the outer sleeve 2 is rotated further, the first pivot stub 20 moves along the entire extent of the long portion 24a. However, the cam member 26 encounters the end wall 28b joining the long 24a and short 24b portions. Hence, contact between the cam member 26 and the end wall 28b causes the first pivot stub 20 and the butterfly valve 16 to be rotated to the position of FIG. 7(b) and then to the open state illustrated in FIG. 7(c). In the illustrated embodiment, the butterfly valve 16 abuts an actuation shaft 36, to be described below. This prevents further clockwise rotation. Of course any other suitable stop may also be used.

When the outer sleeve 2 is rotated in the opposite direction, the cam member 26 will similarly come into contact with the end wall 28a such that the first pivot stub 20 and the butterfly valve 16 will be rotated to the closed state illustrated in FIG. 7(a).

In the illustrated embodiment, the short portion 24b has a greater extent than a width of the cam member 26. Hence, some rotation of the outer sleeve 2 is possible without any interaction between the cam member 26 and the end walls 28a and 28b. This introduces some lost motion into the operation of the device.

When rotating the outer sleeve 2 from the position illustrated in FIG. 7(a), the valve 16 will first remain in the orientation illustrated in FIG. 7(a), in particular, in the closed state. It will only be when the end of the cam member 26 comes into contact with the end wall 28b that the first pivot stub 20 and the butterfly valve 16 will be rotated to the position illustrated in FIG. 7(b).

Figure 6:
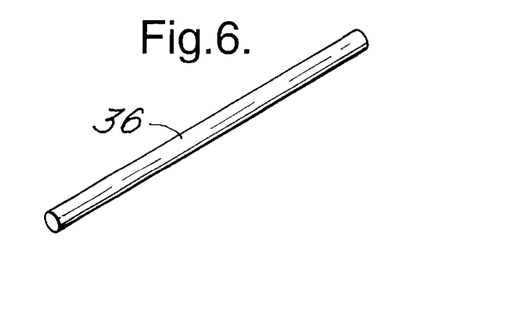
FIG. 6 is a perspective view of the actuation shaft of the device of FIG. 1.

Returning to FIG. 4, a first support opening 30 is provided in the wall of the inner sleeve 8 diametrically opposed to a second support opening 32. An actuation shaft 36 as illustrated in FIG. 6 is mounted through the support openings 30, 32 so as to protrude from either side.

Circumferentially extending apertures 38 and 40 are provided in the outer sleeve 2 for receiving the ends of the actuation shaft 36. Indeed, the ends of the actuation shaft 36 extend beyond the outer surface of the outer sleeve 2 so as to form protruding bayonet pins.

Figure 8:
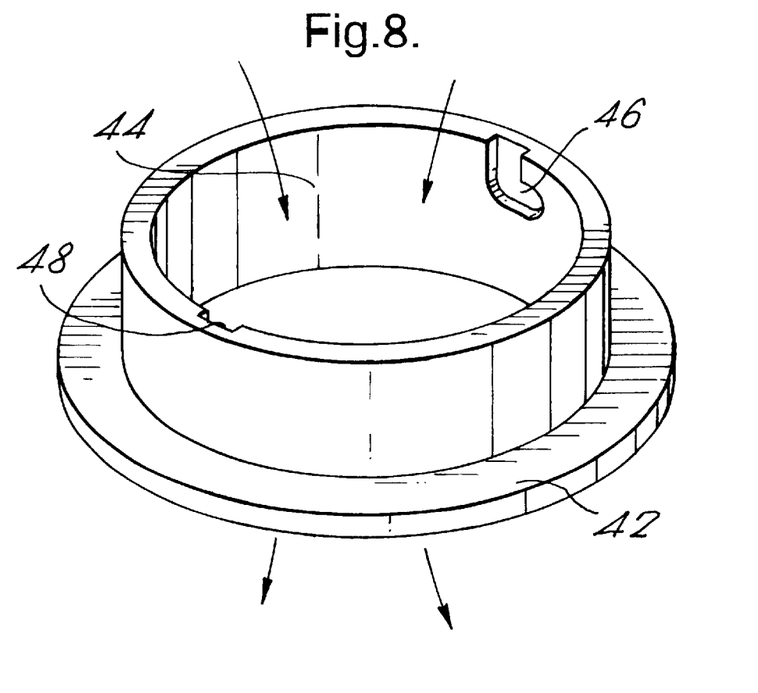
FIG. 8 is a perspective view of a receptacle to which the device of FIG. 1 may be fitted.

The valve device is intended for use with a receptacle 42 as illustrated in FIG. 8. The receptacle 42 may form part of a dispensing or applicator device. It includes a female bayonet fitting having a cylindrical opening 44 for receiving the outer sleeve 2 and a through hole so as to allow material to flow from the valve device through the receptacle 42.

The female bayonet fitting is constructed in a known manner, in particular with two opposed L-shaped channels 46, 48. Thus, in use, the outer sleeve 2 is inserted axially into the cylindrical opening 44 of the receptacle 42 with the ends of the actuation shaft 36 in the L-shaped channels 46, 48.

When the valve device is first inserted axially into the receptacle 42, the butterfly valve 16 is in the position indicated in FIG. 7(a). As the valve device is then rotated, the extending ends of the actuation shaft 36 move along the circumferential part of the L-shaped channels 46, 48 so as to secure the valve device (and hence the container to which it is attached) to the receptacle by virtue of the bayonet fitting. However, as the user continues to rotate the valve device relative to the receptacle, the ends of the actuation shaft 36 abut the ends of the L-shaped channels 46,48 such that they and the inner sleeve 10 are prevented from further rotation. As a result, further rotation of the valve device (which will be by means of the outer sleeve 2 or the container to which it is attached) will cause the outer sleeve 2 to rotate relative to the inner sleeve 10. Hence, as explained above, the butterfly valve 16 will be moved from the closed state of FIG. 7(a) to the open states of FIG. 7(c).

As illustrated in FIG. 2, by locating the actuation shaft 36 at an appropriate distance from the butterfly valve axis, an advantageous use of the actuation shaft 36 is to prevent the butterfly valve 16 from rotating further. Otherwise, the actuation shaft 36 could be replaced by bayonet pins which extend merely from the walls of the inner sleeve 10.

Although not illustrated, an outer housing may be provided to conceal the profiled opening. Where the outer housing extends over the entire axial length of the outer sleeve 2, it is not necessary for the outer surface of the outer sleeve 2 to be cylindrical, since the outer surface of the housing can take a cylindrical form and form part of the bayonet surface for insertion into a receptacle. In that case, the ends of the actuation shaft 36 should extend through the housing so as to be engageable with the channels 46, 48 of the receptacle.

Figure 9:
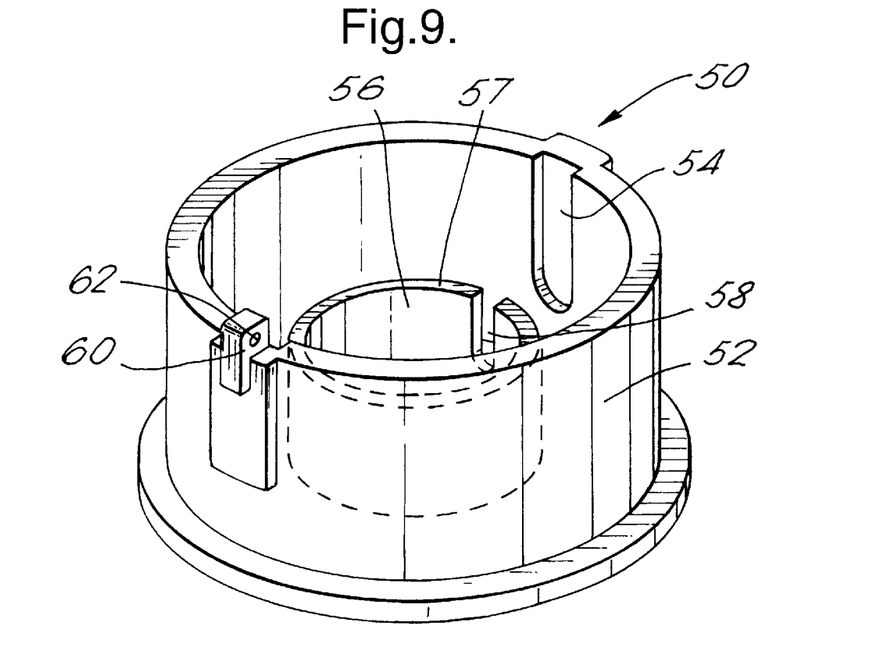
FIG. 9 is a perspective view of a cap for the valve device of FIG. 1.

FIG. 9 illustrates a cap 50 for fitment over the valve device from the second end 2b. In use, when a material is supplied in a container having a valve device attached to it, it is proposed to provide a cap such as illustrated in FIG. 9, to prevent the valve device from being tampered with whilst in transient. The cap 50 includes an outer wall 52 for receiving the outer sleeve 2. The outer wall 52 includes a pair of diametrically opposed recessed channels 54 for receiving the bayonet pins formed on the ends of the actuation shaft 36. Hence, it will be seen that the valve device may be inserted into the cap 50 with its second end 2b forward.

Within the outer wall 52 is a concentric cylindrical wall 56 which extends into the through passage 11 within the inner sleeve 10. Preferably, the wall 56 is dimensioned to contact the inner surface of the inner sleeve 10 so as to hold the valve device securely. As illustrated, diametrically opposed slots 58 are provided in the wall 56 so as to allow insertion of the wall 56 over the actuation shaft 36. In other words, when the valve device is inserted into the cap 50, the actuation shaft 36 moves up the slots 58.

Finally, it will be seen that a security tag 60 is provided on an outer periphery of the outer wall 52. A similar tag, not illustrated, may be provided on the outer wall of the outer sleeve 2. The relative positions of the seal tag 60 and the equivalent tag on the outer sleeve 2 are such that, when the valve device is fitted in the cap 50, the two tags abut one another in a circumferential direction so as to prevent the cap 50 being rotated relative to the outer sleeve 2 in the direction required to open the butterfly valve 16. Hence, with the cap 50 fitted to the valve device, it is not possible to open the butterfly valve 16.

The axial extent of the inner wall 56 is such that, with the cap 50 fitted to the valve device, the distal end 57 of the wall 56 abuts the plate-like member 13 of the butterfly valve 16 so as to prevent the butterfly valve 16 from being opened. Hence, where the butterfly valve 16 is angled slightly when in its closed position, the distal end 57 may form a corresponding angle.

As illustrated, the seal tag 60 includes a through hole 62. The corresponding tag of the outer sleeve 2 may include a similar through hole. It is then possible to provide a security tag through the through holes which requires cutting for its removal. In this way, it is possible to prevent removal of the cap 50 and opening of the butterfly 16 without cutting the security tag and providing a clear indication that the device has been tampered with. Preferably, the outer wall 52 extends the entire length of the outer sleeve 2 so as to prevent any tampering, particularly with the pivoting ends of the butterfly valve 16.

While the above detailed description describes the preferred embodiment of the present invention, the invention is susceptible to modification, variation and alteration without deviating from the scope and fair meaning of the subjoined claims.

What is claimed is:

1. A method of connecting a container of flowable material to a receptacle including the steps of:

providing an outlet of the container and the receptacle with corresponding male and female bayonet fittings respectively;

providing a butterfly valve in the outlet; and rotating the butterfly valve so as to open or close the outlet according to relative rotation of the outlet and at least one bayonet pin of the male bayonet fitting.

2. A valve device for connecting a container filled with a flowable material to a receptacle and for dispensing the flowable material from the container into the receptacle, the valve device including:

an outer sleeve having a first end to be secured to the orifice of a container, a second end for releasable attachment to a receptacle and walls defining a generally cylindrical support passage extending from said first end to said second end;

an inner sleeve within the support passage having walls defining a generally cylindrical outer surface adjacent the walls of the outer sleeve so as to rotatably support the inner sleeve and defining an internal through passage;

a butterfly valve member within the through passage having diametrically opposed first and second pivot stubs, defining an axis, extending at least into the walls of the inner sleeve and rotatably supported by the walls of one of the inner and the outer sleeve;

wherein the walls of the other of the inner and outer sleeve are shaped so as to interact with at least the first pivot stub such that relative rotation of the inner and outer sleeves causes the butterfly valve member to rotate about said axis while said axis is fixed with respect to one of said inner and outer sleeves between a closed state in which the butterfly valve member closes the through passage by substantially filling an internal cross section of the through passage and an open state in which the through passage is open.

3. A valve device according to claim 2 wherein:

the walls of the other of the inner and outer sleeve include a profiled opening; and the first pivot stub extends into the profiled opening and includes a cam member such that relative rotation of the inner and outer sleeves causes interaction of the cam member and the profiled opening to rotate the butterfly valve member between the closed and open states.

4. A valve device according to claim 3 wherein the cam member extends radially of the first pivot stub.

5. A valve device according to claim 4 wherein:

the profiled opening is generally trapezoid in shape, having a long portion extending circumferentially with respect to the generally cylindrical support passage in which the first pivot stub moves with relative rotation of the inner and outer sleeves and a short portion extending circumferentially with respect to the generally cylindrical support passage into which the cam member extends, the cam member being deflected by the walls of the other of the inner and outer sleeves joining the long and short portions so as to rotate the butterfly valve member.

6. A valve device according to claim 3 wherein:

the first and second opposed pivot stubs are rotatably mounted in the walls of the outer sleeve; and the walls of the inner sleeve include at least a first through hole for rotatably supporting the first pivot stub, the walls of the outer sleeve including the profiled opening and the first pivot stub extending through said first through hole into the profiled opening.

7. A valve device according to claim 6 wherein:

at least one of said first and second pivot stubs extends beyond the periphery of the outer sleeve so as to form a bayonet pin for interacting with a bayonet groove of a receptacle.

8. A valve device according to claim 6 wherein:

the walls of the outer sleeve include a first circumferentially extending aperture; and the inner sleeve includes a first bayonet pin extending through the aperture for interacting with a bayonet groove of a receptacle, the circumferential extent of the aperture being sufficient to allow relative rotation of the inner and outer sleeves to cause the butterfly valve member to rotate between the closed and open states.

9. A valve device according to claim 8 wherein:

the walls of the outer sleeve include a second circumferentially extending aperture; and the inner sleeve includes a second bayonet pin extending through the second aperture for interacting with a bayonet groove of a receptacle, the circumferential extent of the second aperture being sufficient to allow relative rotation of the inner and outer sleeves to cause the butterfly valve member to rotate between the closed and open states.

10. A valve device according to claim 9 wherein:

the first and second apertures are diametrically opposed and the first and second bayonet pins are diametrically opposed.

11. A valve device according to claim 8 further including:

an actuation shaft; wherein the inner sleeve includes a pair of diametrically opposed support openings for supporting the actuation shaft therebetween, the actuation shaft extending outwardly of the support openings so as to form the first and second bayonet pins.

12. A valve device according to claim 8 wherein:

the first aperture is axially aligned with the centre of the profiled opening and the first bayonet pin is axially aligned with the centre of the first pivot stub.

13. A valve device according to claim 2 wherein the walls of the other of the inner and outer sleeves and the first pivot stub are shaped so as to interact with lost motion such that the butterfly valve member is rotated between the closed and open states only after intermediate relative rotation of the inner and outer sleeves.

14. A valve device according to claim 2 wherein:

the inner and outer sleeves are relatively rotatable only between two predetermined relative orientations and the butterfly valve member is rotated between the closed and open states only as the inner and outer sleeves approach and are in the vicinity of the predetermined relative orientations.

15. A valve device according to claim 2 further including an outer housing within which the outer sleeve is supported.

16. A valve device according to claim 2 wherein the walls of the outer sleeve further define a generally cylindrical outer surface for fitment to a receptacle.

17. A valve device according to claim 15 wherein the housing includes a generally cylindrical outer surface for fitment to a receptacle.

18. A valve device according to claim 2 wherein the inner and outer sleeves are coaxial generally cylindrical bodies.

19. A container filled with a flowable material having an orifice fitted with a valve device according to claim 2.

* * * * *